(12) United States Patent
Marathe et al.

(10) Patent No.: US 9,419,733 B2
(45) Date of Patent: Aug. 16, 2016

(54) EFFECTIVE BROADCASTING OF EMERGENCY MESSAGES

(71) Applicant: AT&T Intellectual Property I, L.P., Atlanta, GA (US)

(72) Inventors: Nikhil S. Marathe, Roselle, IL (US); Christopher Baldwin, Algonquin, IL (US); Michael Towster, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 152 days.

(21) Appl. No.: 14/086,103

(22) Filed: Nov. 21, 2013

(65) Prior Publication Data
US 2015/0140924 A1  May 21, 2015

(51) Int. Cl.
| | |
|---|---|
| *H04H 20/71* | (2008.01) |
| *H04H 20/59* | (2008.01) |
| *H04W 4/22* | (2009.01) |
| *H04W 4/00* | (2009.01) |
| *H04W 4/02* | (2009.01) |
| *H04W 4/06* | (2009.01) |

(52) U.S. Cl.
CPC .............. *H04H 20/59* (2013.01); *H04W 4/001* (2013.01); *H04W 4/22* (2013.01); *H04W 4/021* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 6,662,163 B1 * | 12/2003 | Albayrak | .............. | H04M 3/493 379/88.22 |
| 6,745,021 B1 * | 6/2004 | Stevens | .................... | H04M 3/42 455/404.1 |
| 7,269,505 B2 | 9/2007 | Zhao et al. | | |
| 7,889,066 B2 | 2/2011 | Mckenna et al. | | |
| 7,894,794 B2 | 2/2011 | Boss et al. | | |
| 8,014,752 B2 | 9/2011 | Chen et al. | | |
| 8,150,925 B2 | 4/2012 | Zimmers et al. | | |
| 8,208,891 B2 | 6/2012 | Jacobs et al. | | |
| 8,326,260 B1 | 12/2012 | Bradish et al. | | |
| 8,380,162 B2 | 2/2013 | Matsuo et al. | | |
| 8,386,583 B2 | 2/2013 | Inoue et al. | | |
| 8,447,813 B2 | 5/2013 | Redmond | | |
| 8,504,090 B2 | 8/2013 | Klein et al. | | |

(Continued)

OTHER PUBLICATIONS

Dan Sandler, Alan Mislove, Ansley Post, Peter Druschel, "FeedTree: Sharing Web Micronews With Peer-to-Peer Event Notification," Peer-to Peer Systems IV, 2005, Springer Berlin Heidelberg.

(Continued)

*Primary Examiner* — Edward Urban
*Assistant Examiner* — Mohammed Rachedine
(74) *Attorney, Agent, or Firm* — Hartman & Citrin LLC

(57) ABSTRACT

Concepts and technologies are disclosed herein for effective broadcasting of emergency messages. An emergency indicator that indicates that an emergency condition exists can be received. A geographic area affected by the emergency condition can be determined and a plurality of devices and a user device located at the geographic area can be identified. The user device can be selected to broadcast an alert to the plurality of devices, and an alert trigger can be sent to the user device. The alert trigger can cause the user device to activate a wireless hotspot at the user device, the wireless hotspot being associated with a dedicated service set identifier, and to broadcast, via the wireless hotspot, an alert indicating the emergency condition.

20 Claims, 8 Drawing Sheets

(56) References Cited

U.S. PATENT DOCUMENTS

| | | |
|---|---|---|
| 8,533,327 B2 | 9/2013 | Mo et al. |
| 8,542,117 B1 | 9/2013 | Miasnik et al. |
| 2002/0128000 A1 | 9/2002 | do Nascimento, Jr. |
| 2007/0082689 A1 | 4/2007 | Talty et al. |
| 2009/0163170 A1 | 6/2009 | Norp et al. |
| 2009/0310561 A1 | 12/2009 | Grob et al. |
| 2010/0073161 A1 | 3/2010 | Engel |
| 2012/0040636 A1* | 2/2012 | Kazmi .................... H04W 4/22 455/404.2 |
| 2012/0185897 A1 | 7/2012 | Gould et al. |
| 2012/0190325 A1 | 7/2012 | Abu-Hakima et al. |
| 2012/0315841 A1* | 12/2012 | Zhou .................... H04B 7/2606 455/11.1 |
| 2013/0017801 A1 | 1/2013 | Shaikh |

OTHER PUBLICATIONS

Jose J. Gonzalez, Ole-Christoffer Granmo, Bjorn Erik Munkvold, Frank Y. Li, Julie Dugdale, "Multidisciplinary Challenges in an Integrated Emergency Management Approach," Proceedings of the $9^{th}$ International ISCRAM Conference, Apr. 2012, Vancouver, Canada.

Jeff Brown, Bill Shipman, Ron Vetter, "SMS: The Short Message Service," Computer 40.12, Dec. 2007, pp. 106-110.

Satish Narayana Srirama, Matthias Jarke, Wolfgang Prinz, "A Mediation Framework for Mobile Web Service Provisioning," Enterprise Distributed Object Computing Conference Workshops, EDOCW'06, $10^{th}$ IEEE International, 2006, IEEE.

\* cited by examiner

EFFECTIVE BROADCASTING OF EMERGENCY MESSAGES

BACKGROUND

In recent years, the usage of mobile computing devices and mobile communication devices has increased in terms of numbers of users and in terms of frequency of use. Furthermore, some consumers today have migrated or upgraded from using feature phones that may support only voice calls and/or text messaging functions to using smart phones that may use one or more data connections and/or one or more voice connections to provide users with various functions such as text messaging, email access, video calling functions, Internet calling features, mapping and/or navigation capabilities, camera and/or video features, application functions, web access, voice calls, combinations thereof, or the like.

With the increased ownership and use of mobile communication devices and mobile computing devices, the usage of various network resources has increased drastically. In particular, some modern mobile device users may access data networks to perform various tasks using web applications and/or stand-alone applications executed by the mobile devices. In response to the increased demand for services, some network providers have increased capacity for data communications and voice communications to support the increasing numbers and usage frequencies associated with these and other devices.

When emergencies occur, consumers may use smartphones and/or other mobile computing devices to respond to or deal with the emergencies. For example, users may use the smartphones or other computing devices to create social networking updates regarding the emergency conditions, to capture and/or share photos or videos relating to the emergency conditions, to receive and/or place phone calls relating to the emergency conditions, to receive and/or send text messages or emails relating to the emergencies, and/or may use the devices for other reasons. When emergency personnel are responding or reacting to the emergency conditions, the use of limited network resources by consumers may prevent emergency communications with a relatively higher priority from being successfully made or completed.

SUMMARY

The present disclosure is directed to effective broadcasting of emergency messages. An alert service can be operated as a virtualized service by executing an alert service or other application on a computing device such as a server computer. The alert service can be configured to obtain an indication of an emergency as implicit or explicit data. In some embodiments, the alert service can be configured to receive an emergency indicator from a source. The source can include, for example, social networking or messaging services; traffic, weather, or emergency alert systems or devices; residential, commercial, governmental, or other alarm systems or services; other monitoring systems, devices, services, networks, or the like; combinations thereof; or the like.

The alert service can be configured to determine a venue, geographic area, geographic location, and/or other location ("affected area") that is affected by an emergency condition associated with the emergency indicator. The alert service can be configured to identify the affected area based upon implicit or explicit data included in the emergency indicator and/or based upon other considerations. In some embodiments, the alert service can be configured to query one or more devices or networks to determine the affected area and in some embodiments, the alert service can identify the affected area based upon data included in the emergency indicator.

The alert service also can be configured to identify one or more devices at or near the affected area. In some embodiments, the alert service can be configured to communicate with various devices configured to execute an alert application. For example, the alert application can be configured to cause a device executing the alert application to periodically report a geographic location to the alert service and/or to respond to queries for location information and/or operational data with the location information. In some other embodiments, the alert service can access location servers, location registers, and/or other devices, systems, networks, and/or data structures to identify one or more devices at or near an affected area.

The alert service can be configured to obtain, from one or more devices located at or near the affected area, operational data. The operational data can include, in some embodiments, various data that describe or indicate operating characteristics of the one or more devices. In some embodiments, the operational data can include location information such as geographic location information obtained using a location device of the one or more devices, a battery status indicator that indicates a current battery level and/or expected life of a battery of the one or more devices, and a WiFi status indicator that indicates a current status and/or availability of a WiFi transmitter, receiver, or transceiver of the one or more devices. Because the operational data can include additional and/or alternative information or indicators, it should be understood that these examples are illustrative and therefore should not be construed as being limiting in any way.

Based upon the operational data and/or aspects of the emergency condition determined by the alert service, the alert service can identify a device that is to broadcast an alert to the other devices located at or near the affected area. In some embodiments, for example, the alert service can select the device based upon the location, the battery status, and/or the WiFi status of the various devices. It should be understood that this example is illustrative and therefore should not be construed as being limiting in any way.

The alert service can generate an alert trigger that includes an indication of the emergency condition, instructions for responding to the emergency condition, data indicating an area, region, or location affected by the emergency condition, instructions for broadcasting an alert to other devices at or near the affected area, and/or other information. The alert service can transmit the alert trigger to the device and the device can generate and broadcast an alert to the other devices to inform the other devices about the emergency condition.

In some embodiments, the device can broadcast the alert to the other devices by activating a WiFi transmitter or transceiver at the device and broadcasting the alert using the WiFi transmitter or transceiver. According to various embodiments of the concepts and technologies described herein, the device activates the WiFi hardware and assigns a unique dedicated service set identifier ("SSID") that may be used only for emergency communications. In one contemplated embodiment, the device activates a WiFi hotspot at the device via which the alert is transmitted to other devices in, at, or near the affected area. Thus, some embodiments of the concepts and technologies described herein can be used to move broadcasting of emergency messages from a network to devices in an affected area, thereby freeing resources of the network for use by emergency responders and/or other personnel. It should be understood that this example is illustrative and therefore should not be construed as being limiting in any way.

The devices can monitor wireless signals to detect activation of WiFi hardware associated with the dedicated SSID. When a communication associated with the dedicated SSID is detected, the devices can receive the alert and communicate information associated with the alert to a user or other entity. In one contemplated embodiment, the devices can present a user interface or user interface element to inform a user about the emergency and/or to inform the user or other entity regarding how to respond to the emergency. These and other aspects of the concepts and technologies described herein will be illustrated and described in more detail below.

According to one aspect of the concepts and technologies disclosed herein, a method is disclosed. The method can include receiving, at a processor that executes an alert service, an emergency indicator that indicates that an emergency condition exists. The processor can determine a geographic area affected by the emergency condition and identify two or more devices and a user device located at the geographic area. The processor can select the user device to broadcast an alert to the plurality of devices, and send, by the processor, an alert trigger to the user device. The alert trigger can cause the user device to activate a wireless hotspot at the user device. The wireless hotspot can be associated with a dedicated service set identifier. The alert trigger also can cause the user device to broadcast, via the wireless hotspot, an alert indicating the emergency condition.

In some embodiments, selecting the user device can include determining, for each of the plurality of devices and the user device, an ability to activate the wireless hotspot and a battery level, and selecting, based upon the ability and the battery level, the user device. In some embodiments, determining the ability to activate the wireless hotspot and the battery level can include obtaining, for each of the plurality of devices and the user device, operational data that can include location data, battery status information, and WiFi status information. The method also can include selecting, based upon the operational data, the user device. In some embodiments, the dedicated service set identifier can include a service set identifier used for emergency communications, and each of the plurality of devices can be configured to monitor wireless signals to detect activation of the wireless hotspot with the dedicated service set identifier.

In some embodiments, the emergency indicator can be received from a source. The source can include a social networking service. The emergency indicator can include an implicit indicator that the emergency condition exists, and the implicit indicator can be determined based upon analysis of two or more social networking posts. In some embodiments, the emergency indicator can include an explicit indicator that the emergency condition exists.

In some embodiments, the source can include an emergency dispatcher, and the emergency indicator can include an explicit indicator that the emergency condition exists. In some embodiments, the alert can include a description of the emergency condition, an indication of the geographic area, and instructions for responding to the emergency condition. In some embodiments, the alert can include data for generating a user interface for presenting the description, the indication, and the instructions. In some embodiments, the user device can include a smart phone that executes an alert application. The user device can generate an alert in response to the alert trigger and broadcast the alert via the wireless hotspot.

According to another aspect of the concepts and technologies disclosed herein, a system is disclosed. The system can include a processor and a memory that stores computer-executable instructions that, when executed by the processor, cause the processor to perform operations. The operations can include receiving an emergency indicator that indicates that an emergency condition exists, determining a geographic area associated with the emergency condition, identifying two or more devices and a user device located at the geographic area, selecting the user device to broadcast an alert to the plurality of devices, and sending an alert trigger to the user device. The alert trigger can cause the user device to activate a wireless hotspot at the user device. The wireless hotspot can be associated with a dedicated service set identifier. The alert trigger also can cause the user device to broadcast, via the wireless hotspot, an alert indicating the emergency condition.

In some embodiments, the system also can include a source. The emergency indicator can be received from the source, and the source can include a server computer that can host a social networking service. In some embodiments, the source can include a computer device associated with an emergency dispatcher. In some embodiments, selecting the user device can include determining, for each of the plurality of devices and the user device, an ability to activate the wireless hotspot and a battery level, and selecting, based upon the ability and the battery level, the user device.

In some embodiments, determining the ability to activate the wireless hotspot and the battery level can include obtaining, for each of the plurality of devices and the user device, operational data can include location data, battery status information, and WiFi status information, and selecting, based upon the operational data, the user device. In some embodiments, the dedicated service set identifier can include a service set identifier used for emergency communications, and each of the plurality of devices can monitor wireless signals to detect activation of the wireless hotspot with the dedicated service set identifier.

According to yet another aspect, a computer storage medium is disclosed. The computer storage medium can have computer-executable instructions stored thereon that, when executed by a processor, cause the processor to perform operations. The operations can include receiving an emergency indicator that indicates that an emergency condition exists, determining a geographic area associated with the emergency condition, identifying two or more devices and a user device located at the geographic area, selecting the user device to broadcast an alert to the plurality of devices, and sending an alert trigger to the user device. The alert trigger can cause the user device to activate a wireless hotspot at the user device. The wireless hotspot can be associated with a dedicated service set identifier. The alert trigger also can cause the user device to broadcast, via the wireless hotspot, an alert indicating the emergency condition.

In some embodiments, selecting the user device can include determining, for each of the plurality of devices and the user device, an ability to activate the wireless hotspot and a battery level, and selecting, based upon the ability and the battery level, the user device. In some embodiments, determining the ability to activate the wireless hotspot and the battery level can include obtaining, for each of the plurality of devices and the user device, operational data that can include location data, battery status information, and WiFi status information, and selecting, based upon the operational data, the user device. In some embodiments, the dedicated service set identifier can include a service set identifier used for emergency communications, and each of the plurality of devices can monitor wireless signals to detect activation of the wireless hotspot with the dedicated service set identifier.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
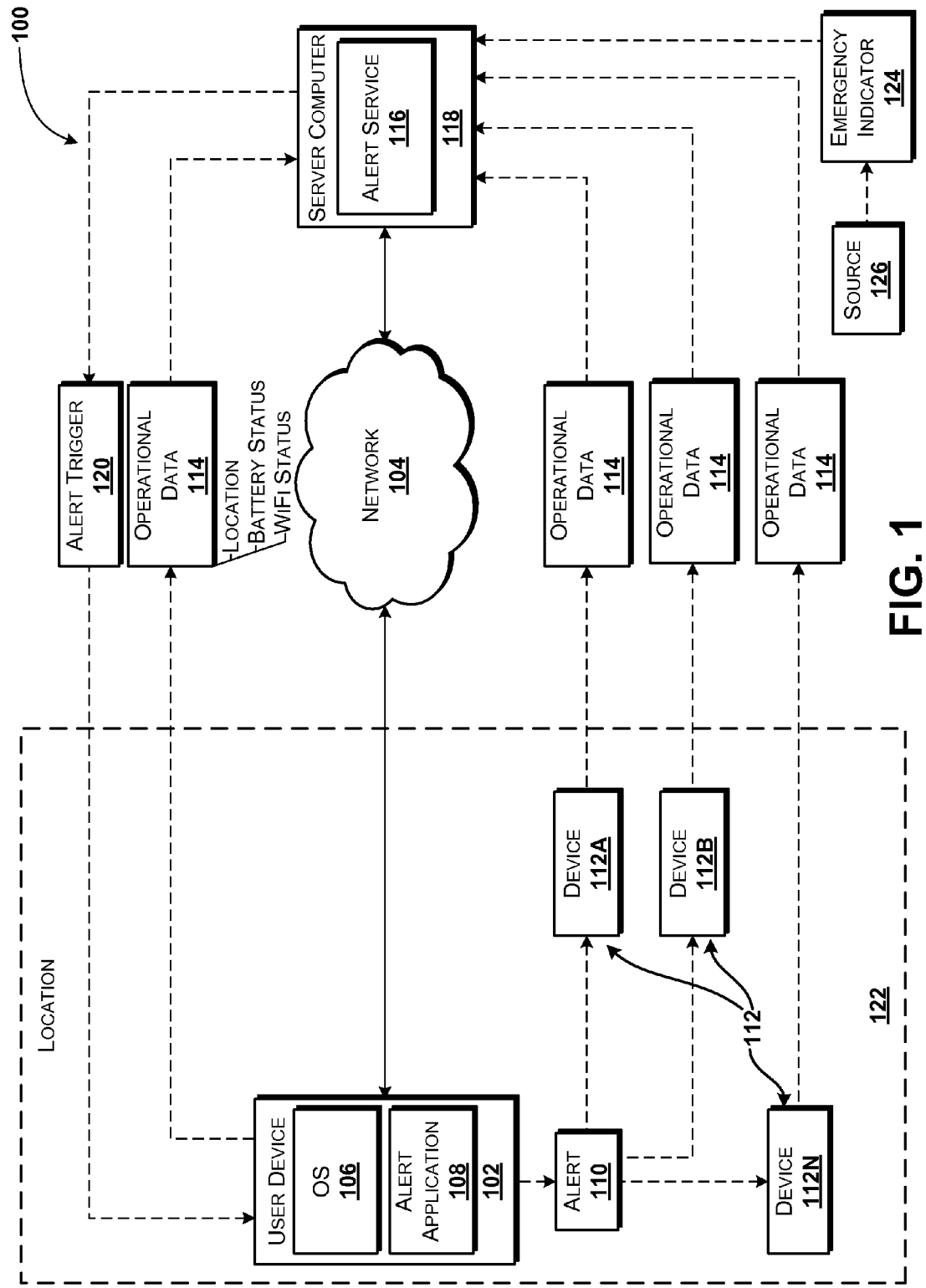
FIG. 1 is a system diagram illustrating an illustrative operating environment for the various embodiments disclosed herein.

The following detailed description is directed to effective broadcasting of emergency messages. As used herein, the phrase "effective broadcasting of emergency messages" can be used to refer to embodiments wherein a single message can be sent to a single device by a communications network, and the single device can be configured to alert other devices near the single device via a broadcast message or data. Thus, the broadcasting can be moved from a network such as a wireless telephone network to a local real or virtual network.

According to various embodiments of the concepts and technologies described herein, an alert service may be executed by a computer or server computer and can receive an emergency indicator. The emergency indicator may be received as explicit data and/or can be received as other types of data that are determined by the alert service, via analysis of explicit or implicit data included in the data, to include emergency indicators. In one contemplated embodiment, the emergency indicator can be determined to exist based upon analysis of one or more social networking updates or messages. It should be understood that this example is illustrative and therefore should not be construed as being limiting in any way.

The alert service can determine a geographic area or location affected by an emergency condition indicated by the emergency indicator. The alert service also can identify multiple devices in the affected area. If only one device is located at or near the affected area, the alert service can send a single message to the one device with an alert relating to the emergency condition. If multiple devices exist within the affected area, the alert service can obtain operational data that indicates at least a location of the device, a battery status of the device, and a WiFi transmitter or transceiver status of the device. The alert service can analyze the operational data to select a device to broadcast an alert to the other devices at or near the affected area.

The alert service can generate an alert trigger and send the alert trigger to the device selected to broadcast the alert. The alert trigger can include an indication relating to the emergency condition, instructions for responding to the emergency, data indicating an area affected by the emergency condition, combinations thereof, or the like. The device can receive the alert trigger and broadcast an alert to other devices in a vicinity of the device. According to various embodiments, the device can activate a WiFi transmitter or transceiver to broadcast the alert to devices at or near the affected area. In various embodiments, the device can activate or create a WiFi hotspot or access point that is associated with a dedicated unique service set identifier and broadcast the alert using the WiFi hotspot or access point.

Other devices at or near the affected area can monitor wireless signals for activation of a wireless transmitter or transceiver associated with the dedicated service set identifier. If a wireless transmitter or transceiver associated with the dedicated service set identifier is detected, the devices can obtain the alert when the alert is broadcast via the WiFi hotspot or access point. Thus, embodiments of the concepts and technologies described herein can support propagation of alerts or messages to multiple devices while using network resources only for a single message to a single device. Thus, some embodiments of the concepts and technologies described herein can reduce network usage for broadcasting emergency messages. This, in turn, can be used to free network resources for emergency responders and/or other personnel for various reasons.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing effective broadcasting of emergency messages will be described, according to an illustrative embodiment. The operating environment 100 shown in FIG. 1 includes a user device 102 operating in communication with a communications network ("network") 104. Various aspects of the network 104 will be illustrated and described in detail below, particularly with reference to FIG. 6.

According to various embodiments, the functionality of the user device 102 may be provided by one or more smartphones, feature phones, personal digital assistants ("PDAs"), tablet computers, smart watches, mobile media devices, other computing devices, combinations thereof, or the like. In some other embodiments, the functionality of the user device 102 may be provided by one or more laptop computers, other computing systems, or the like. For purposes of describing the concepts and technologies disclosed herein, the user device 102 is described herein as a mobile computing device such as a smartphone. It should be understood that this embodiment is illustrative, and should not be construed as being limiting in any way.

The user device 102 can execute an operating system 106, one or more application programs (not shown in FIG. 1), and an alert application 108. The operating system 106 can include an executable program that controls the operation of the user device 102. The application programs can include executable programs configured to execute on top of the operating system 106 to provide various functions. In some embodiments, the application programs can include, but are not limited to, web browsers, web applications, mail applications, native applications, media applications, camera and/or video applications, combinations thereof, or the like. Because various embodiments of application programs are generally known, the application programs are not described in additional detail herein.

The alert application 108 can include an executable program configured to execute on top of the operating system 106 to provide various functions described herein for providing effective broadcasting of emergency messages. In particular, the alert application 108 can be configured to broadcast an alert 110 to devices 112A-N (hereinafter collectively and/or generically referred to as "devices 112"). According to various embodiments of the concepts and technologies described herein, the devices 112 are located in a proximity of the user device 102.

In particular, the proximity of the user device 102 can be defined in various ways. In some embodiments, the proximity of the user device 102 can be defined as a broadcast range of the user device 102. In particular, in various embodiments in which the user device 102 broadcasts using IEEE 802.11x signals ("WiFi signals"), the proximity of the user device 102 can be from about fifty feet up to about three hundred feet, depending upon ambient temperature, ambient radio signal usage, whether the user device 102 is indoors or outdoors, the orientation of the user device 102 and/or a WiFi transceiver thereof, combinations thereof, or the like. It should be understood that this example is illustrative and therefore should not be construed as being limiting in any way.

The alert application 108 also can be configured to provide the functionality described herein for generating and reporting operational data 114. According to various embodiments, the alert application 108 can be configured to communicate with an alert service 116 that is hosted and/or executed by a computing system such as, for example, a server computer 118. The functionality of the server computer 118 can be provided by one or more real or virtual computing resources. The functionality of the server computer 118 additionally or alternatively can be provided by multiple distributed computing resources, if desired. As such, the illustrated embodiment showing a single server computer 118 is illustrative of only one contemplated embodiment and therefore should not be construed as being limiting in any way.

According to various embodiments of the concepts and technologies described herein, the alert service 116 can be executed by the server computer 118 and can be configured to obtain the operational data 114 from the user device 102 and/or the devices 112. The operational data 114 can be used by the alert service 116 to identify a candidate device to broadcast the alert 110 in an emergency condition or situation, as will be explained in more detail below. As will be explained in more detail below, the operational data 114 can be obtained on request by the alert service 116 and/or reported by the user device 102 and/or the devices 112 periodically.

The alert service 116 also can be configured to generate an alert trigger 120. The alert trigger 120 can indicate that an emergency condition exists. The alert trigger 120 also can prompt a device such as the user device 102 and/or one or more of the devices 112 to generate the alert 110 and/or to broadcast the alert 110 to other devices in a defined proximity of the broadcasting entity. According to various embodiments, the user device 102 and the devices 112 are located within a defined area or region ("location") 122. The location 122 can include a building, a venue, an outdoors area, a region, or the like. According to various embodiments of the concepts and technologies described herein, the location 122 can correspond to a wireless range of a wireless transceiver of the user device 102. It should be understood that this example is illustrative and therefore should not be construed as being limiting in any way.

As will be explained in more detail below, the user device 102 can enter or otherwise be located at the location 122. The alert service 116 can detect an emergency condition. The emergency condition can be at or near the location 122, or can be determined to affect users or other entities at or near the location 122. According to various embodiments, the emergency at the location 122 may be detected by the alert service 116 via monitoring of various information sources such as social networking services, news services, emergency and/or emergency dispatch services, combinations thereof, or the like. In some embodiments, the alert service 116 can be configured to monitor social networking services to identifying trending or popular topics relating to a particular location. For example, if one or more real time messages or social networking posts include a reference to an emergency condition at a particular venue, the alert service 116 can be configured to detect these messages and/or posts to identify the emergency and the location. It should be understood that this example is illustrative and therefore should not be construed as being limiting in any way.

According to various embodiments, the alert service 116 can be configured to receive an emergency indicator 124. The emergency indicator 124 can indicate that the emergency condition exists. The emergency indicator 124 can include an explicit indicator received from a source 126 such as, for example, an emergency reporting system, an emergency dispatcher, an alarm service, a news service, combinations thereof, or the like. The emergency indicator 124 also can include implicitly generated emergency indicators. For example, the emergency indicator 124 can be generated by the alert service 116 or provided to the alert service 116 by the source 126 based upon social networking information or trends, posts, or real time messages; news information; traffic information; weather information; combinations thereof; or the like. Because the alert service 116 can become aware of an emergency condition in any number of manners, it should be understood that these examples are illustrative and therefore should not be construed as being limiting in any way.

At some point in time, a device or user can enter or otherwise be located at or near the location 122. At some other point in time before, during, or after the point in time at which the device or user enters or otherwise is located at the location 122, the alert service 116 can receive an emergency indicator 124. Upon receiving the emergency indicator 124, the alert service 116 can be configured to identify a type of emergency indicated by the emergency indicator and a geographic location that is affected by or near an area affected by the emergency condition. In FIG. 1, the area affected by the emergency condition can correspond to the location 122. It should be understood that this example is illustrative and therefore should not be construed as being limiting in any way.

The alert service 116 can identify a number of users or devices located at or near the location 122. According to some embodiments, the alert service 116 can be configured to communicate with various network elements such as, for example, a home location register ("HLR") or visitor location register ("VLR") to locate users or other entities in, at, or near an affected area such as the location 122. In some other embodiments, the alert service 116 can be configured to communicate with a location server or other network element to identify users or other entities in, at, or near an affected area such as the location 122. According to still other embodiments, the alert service 116 can query network elements such as mobile switching centers ("MSCs"), base transceiver stations ("BTSs"), combinations or equivalents thereof, or the like to identify devices connected to particular towers, sectors, or cells, and to query those devices or other location elements of the network for a more accurate indication of location.

According to some embodiments, the alert service 116 identifies devices in, at, or near the location 122 in any of a variety of manners and requests or pulls operational data 114 from the devices in, at, or near the location 122. The operational data 114 can include location information that represents a geographic location of the device that generated the operational data 114, a battery life indicator that indicates a current battery level associated with the device that generated the operational data 114, a WiFi status indicator that indicates an operating status and/or capabilities of a WiFi transceiver associated with the device that generated the operational data 114, combinations thereof, or the like.

According to one embodiment of the concepts and technologies described herein, the operational data 114 includes at least the battery life indicator and the WiFi status indicator. According to another embodiment of the concepts and technologies described herein, the operational data 114 includes at least the location information, the battery life indicator, and the WiFi status indicator. It should be understood that these examples are illustrative and therefore should not be construed as being limiting in any way.

As will be explained in more detail below, the alert service 116 can analyze the operational data 114 and/or the emergency indicator 124 to identify devices or entities in, at, or near the location 122. The alert service 116 also can determine how to effectively broadcast an alert to devices in, at, or near the location 122. As used herein, the phrase "effectively broadcast" with respect to an alert or other emergency message can be used to refer to a network device or system propagating an alert to multiple devices while using minimal network resources. In particular, some embodiments of "effectively broadcasting an emergency message" to multiple devices includes an alert service 116 sending a single alert trigger 120 to a user device 102, and the user device 102 propagating an alert 110 based upon the alert trigger 120 to devices 112 in, at, or near a proximity of the user device 102. Thus, the devices 112 and the user device 102 can be made aware of an emergency condition without using additional network resources after the initial alert trigger 120 is sent to the user device 102. It should be understood that this example is illustrative and therefore should not be construed as being limiting in any way.

In one example embodiment of the concepts and technologies described herein, the alert service 116 can receive an emergency indicator 124 that indicates that an emergency condition exists at the location 122. As explained above, the emergency indicator 124 can be received from a source 126 that generates the emergency indicator 124 based upon explicit emergency indicators such as 911 calls, alarm reports, emergency dispatch systems, or the like, or implicitly generated based upon analysis of various data such as social networking data, news, or the like.

The alert service 116 can identify an area affected by the emergency condition such as, for example, the location 122. The identification of the area affected by the emergency condition can be completed based upon the emergency indicator 124, or analysis of the emergency indicator 124. For example, if the emergency indicator 124 indicates a fire at a particular building, the alert service 116 can determine that the affected area corresponds to the building, to a city block at which the building is located, to a strip mall or neighborhood in which the building is located, combinations thereof, or the like. Similarly, if the emergency condition corresponds to a weather event or other event (e.g., presidential motorcade, road closure, or the like) that may affect a wide region or area, the alert service 116 can determine that the affected area corresponds to a neighborhood, a city or town, a county, state, or even region of the country. It should be understood that these examples are illustrative and therefore should not be construed as being limiting in any way.

Based upon the affected location, the alert service 116 can identify users, devices, or other entities within the affected location. In the embodiment shown in FIG. 1, the alert service 116 can identify the user device 102 and the devices 112 that are located within the location 122. It should be understood that this example is illustrative and therefore should not be construed as being limiting in any way.

The alert service 116 also can query the devices or other entities within the affected location to determine which of the devices or other entities is to be used to propagate an alert to other devices in, at, or near the affected area. According to some embodiments of the concepts and technologies described herein, the alert service 116 can obtain operational data 114 from the user device 102 and/or the devices 112. In some embodiments, the alert service 116 requests the operational data 114 from the user device 102 and/or the devices 112, while in some other embodiments, the user device 102 and/or the devices 112 can be configured to report the operational data 114 to the alert service 116 according to schedules, according to intervals, and/or according to other considerations. As such, it should be understood that the alert service 116 can obtain the operational data 114 with or without requesting the operational data 114 from the user device 102 and/or the devices 112.

As explained above, the operational data 114 can indicate, for each entity or device that generated the operational data 114, a location, battery level, WiFi status, or the like. In some embodiments, for example, the operational data 114 can indicate current data usage, current voice usage, data and/or voice capabilities, or the like. The alert service 116 can analyze the operational data 114 to select a device or entity that will propagate (e.g., via broadcasting) an alert 110 to other devices in, at, or near the location 122 and/or in, at, or near a proximity of the device or entity.

According to some embodiments, the alert service 116 can select a device or entity that is to broadcast the alert 110 based upon a location of the device or entity relative to other devices or entities within the location 122 and/or within a proximity of the device or entity. For example, the alert service 116 can be configured to select a device that is centrally located within the location 122 based upon an assumption that a centrally located device or entity may be able to broadcast the alert 110 to more devices 112 than a non-centrally-located device or entity. Because a centrally-located device may not be desired in some circumstances, for example if the devices at the location 122 are not distributed through the location 122, and because other considerations may be used to select the device that is to broadcast the alert 110, it should be understood that this example is illustrative and therefore should not be construed as being limiting in any way.

According to some embodiments, the alert service 116 can select a device or entity that is to broadcast the alert 110 based upon a battery level of the device or entity. For example, the alert service 116 can be configured to select a device that has a highest amount of available battery relative to other devices or entities located within the location 122 based upon an assumption that a device or entity having the most battery life will be able to broadcast the alert 110 for longer and/or to more devices 112 than a device or entity having comparatively less battery power. Because this assumption may be incorrect in some circumstances and/or because other considerations may be used to select the device that is to broadcast the alert 110, it should be understood that this example is illustrative and therefore should not be construed as being limiting in any way.

According to some embodiments, the alert service 116 can select a device or entity that is to broadcast the alert 110 based upon a WiFi status associated with the device or entity. For example, the alert service 116 can be configured to select a device that has an enabled WiFi transceiver that is not in use. This selection may be based upon an assumption that a device or entity having a WiFi transceiver that is enabled and not in use will be more quickly able to activate and use the WiFi transceiver than a device that has a disabled WiFi transceiver and/or an enabled and in-use WiFi transceiver. Because this assumption may be incorrect in some circumstances and/or because other assumptions may drive selection of the device that is to broadcast the alert 110, it should be understood that this example is illustrative and therefore should not be construed as being limiting in any way.

Upon identifying the device or entity that is to broadcast the alert 110, in the illustrated example the user device 102, the alert service 116 can generate an alert trigger 120. The alert trigger 120 can indicate the emergency condition and/or instructions for dealing with the emergency condition. The alert service 116 also can transmit, or request other network elements to transmit, the alert trigger 120 to the user device 102. According to various embodiments of the concepts and technologies described herein, the alert trigger 120 can be transmitted to the user device 102 as a short message service ("SMS") message, a multimedia message service ("MMS") message, a special purpose short message, a message sent over a control channel such as a broadcast control channel ("BCCH") or other control channel, a push notification, combinations thereof, or the like. Because the alert trigger 120 can be provided to the user device in a variety of manners, it should be understood that these examples are illustrative and therefore should not be construed as being limiting in any way.

The user device 102 can be configured to receive the alert trigger 120. According to some embodiments of the concepts and technologies described herein, the user device 102 can execute the alert application 108 to receive and/or interpret the alert trigger 120. According to various embodiments, the alert application 108 can analyze the alert trigger 120 and generate the alert 110 based upon the alert trigger 120. The alert 110 can indicate the emergency condition and/or provide information for responding to the emergency condition. In some embodiments, the alert 110 can include an instruction that, when interpreted by a device that receives the alert 110, causes the device to cease radio communications via a network such as a cellular network. As such, the alert 110 can be used, in some embodiments, to free bandwidth and/or resources associated with a network for use by government and/or emergency personnel. It should be understood that this example is illustrative and therefore should not be construed as being limiting in any way.

The alert application 108 also can be configured to activate a WiFi transceiver (shown in FIG. 8) of the user device 102. According to some embodiments of the concepts and technologies described herein, the alert 110 is broadcast by the user device 102 using the WiFi transceiver. The alert application 108 can be configured to create and/or to activate the WiFi transceiver and to assign, to a WiFi hotspot or access point created or activated by the alert application 108, a unique and dedicated service set identifier ("SSID"). In some embodiments, the unique dedicated SSID can be used only to broadcast the alert 110, though this is not necessarily the case. Furthermore, the devices 112 can be configured to monitor wireless signals at or near the devices 112 at all times and/or at selected times to determine if wireless resources associated with the unique dedicated SSID have been activated and/or are present.

As such, embodiments of the concepts and technologies described herein can be used to provide an emergency broadcast system that relies upon one or more WiFi transceivers of devices to propagate alerts such as the alert 110. Thus, embodiments of the concepts and technologies described herein can allow networks and network operators to conserve network bandwidth and/or network resources for use by government, emergency, and/or other personnel instead of using resources to propagate or broadcast alerts to devices or entities in areas affected by an emergency condition. It should be understood that this example is illustrative and therefore should not be construed as being limiting in any way.

The devices 112 can be configured to monitor for communications via a WiFi hotspot, access point, peer-to-peer connection, or other WiFi network connection having the unique dedicated SSID. In some examples, the devices 112 can monitor for a WiFi hotspot or access point that has or is associated with the unique dedicated SSID. This example is described herein for purposes of illustration. Because other types of WiFi connections or networks can be used, it should be understood that this example is illustrative and therefore should not be construed as being limiting in any way.

Upon recognizing activation of the WiFi hotspot or access point having the unique dedicated SSID, the devices 112 can receive the alert 110 via the WiFi hotspot or access point. In some embodiments, the user device 102 can be configured, via the alert application 108, to determine if all devices 112 have received the alert 110 and, if not, to continue broadcasting the alert 110 over the WiFi hotspot or access point. The identification of the devices 112 by the user device 102 can be based upon the alert trigger 120, which can include in some embodiments identification of the number of devices in, at, or near the location 122 and/or identifying information for each of the devices. It should be understood that these examples are illustrative and therefore should not be construed as being limiting in any way. Additional aspects of the concepts and technologies described herein are set forth below, particularly with reference to FIGS. 2-8.

FIG. 1 illustrates one user device 102, one network 104, three devices 112, one server computer 118, and one location 122. It should be understood, however, that various implementations of the operating environment 100 include zero, one, or more than one user device 102, zero, one, or more than one network 104, zero, less than three, three, or more than three devices 112, zero, one, or more than one server computer 118, and/or zero, one, or more than one location 122. As such, the illustrated embodiment should be understood as being illustrative, and should not be construed as being limiting in any way.

Figure 2:
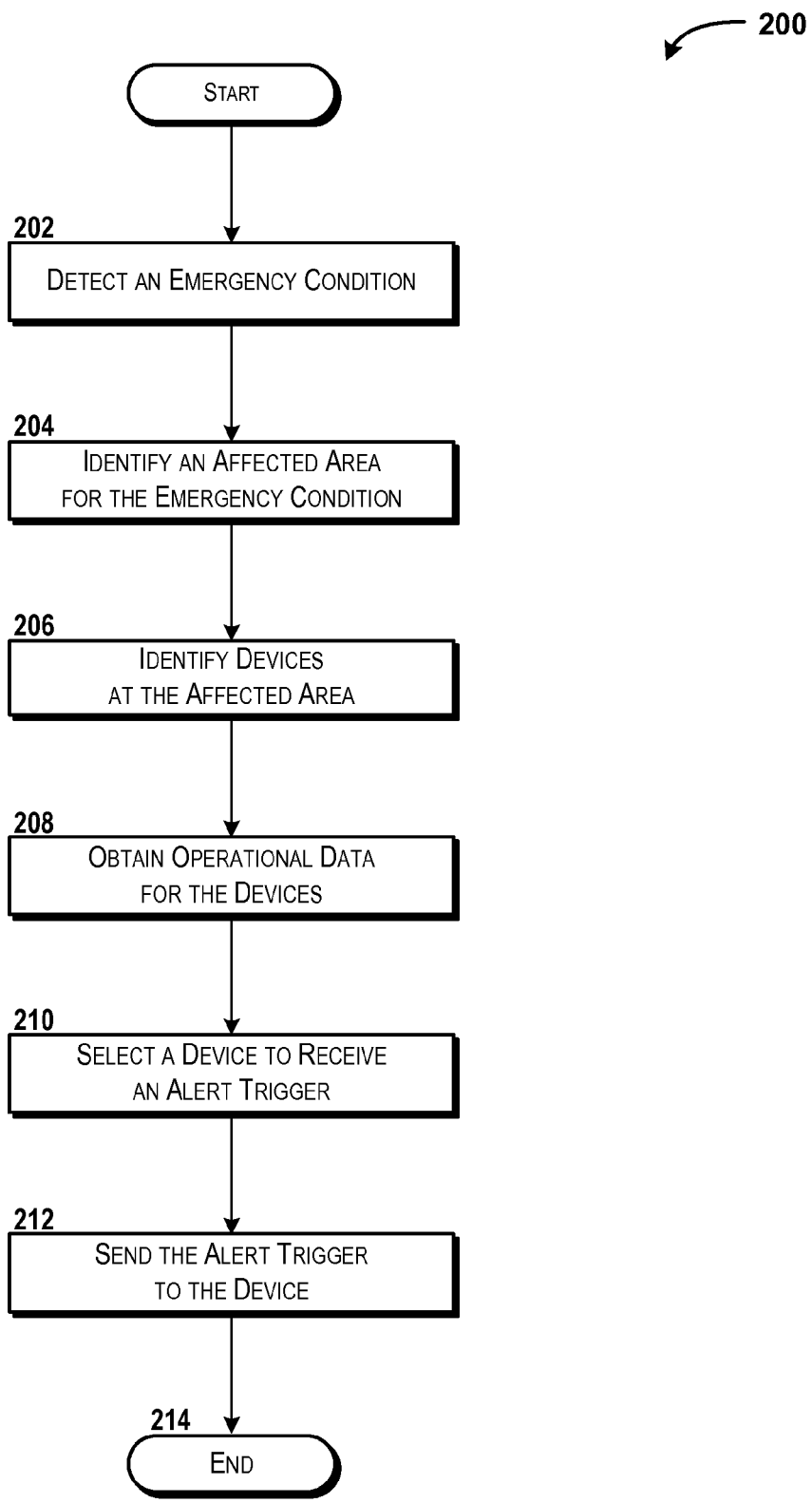
FIG. 2 is a flow diagram showing aspects of a method for sending an alert trigger to a device, according to an illustrative embodiment.

Turning now to FIG. 2, aspects of a method 200 for sending an alert trigger to a device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the devices 112, or the server computer 118, to perform one or more operations and/or causing the processor to direct other components of the computing system or device to perform one or more of the operations.

For purposes of illustrating and describing the concepts of the present disclosure, the method 200 will be described as being performed by the server computer 118 via execution of one or more software modules such as, for example, the alert service 116. It should be understood that additional and/or alternative devices and/or network nodes can provide the functionality described herein via execution of one or more modules, applications, and/or other software including, but not limited to, the alert service 116. Thus, the illustrated embodiments are illustrative, and should not be viewed as being limiting in any way.

The method 200 begins at operation 202. At operation 202, the server computer 118 detects an emergency condition. The server computer 118 can detect an emergency condition, for example, by receiving an emergency indicator 124 from a source 126. Of course, it should be understood that the server computer 118 can receive multiple emergency indicators from multiple sources 126, in some embodiments.

As explained above, the emergency indicator 124 can include an emergency indicator generated by an emergency dispatcher, an emergency indicator generated by a traffic monitor, an emergency indicator generated by a weather monitor or alert system, an emergency indicator generated by a police or other emergency personnel system, combinations thereof, or the like. The emergency indicator 124 also can include, for example, an emergency indicator generated by a device that monitors news, social networking, weather, alarm, and/or traffic systems to detect changes or trends that may indicate an emergency condition. Because the emergency condition can be detected in additional and/or alternative ways, some of which are explained in detail herein, it should be understood that these examples are illustrative and therefore should not be construed as being limiting in any way.

From operation 202, the method 200 proceeds to operation 204. At operation 204, the server computer 118 identifies an affected area for the emergency condition. In some embodiments, the affected area for the emergency condition can be defined by the emergency indicator 124. For example, if the emergency condition corresponds to a weather condition, the emergency indicator 124 can indicate a neighborhood, ZIP code, city, county, or the like, that is affected by the weather condition. Thus, in some embodiments, operation 204 can correspond to the server computer 118 extracting data indicating the affected area from the emergency indicator 124.

In some other embodiments, the server computer 118 can determine the affected area based upon implicit information. For example, the server computer 118 may identify the emergency condition based upon social networking posts or messages, and therefore can identify the affected area based upon implicit analysis of the social networking posts or messages. For example, the server computer 118 can analyze locations associated with the social networking posts or messages and/or locations referenced by the social networking posts or messages to identify the affected area.

In still further embodiments, the server computer 118 can receive data from various sources to identify the affected area. For example, emergency dispatchers, traffic management systems, cellular telephone data, combinations thereof, or the like can be used to identify areas affected by an emergency condition. Because the affected area can be identified in additional and/or alternative ways, it should be understood that these examples are illustrative and therefore should not be construed as being limiting in any way.

From operation 204, the method 200 proceeds to operation 206. At operation 206, the server computer 118 can identify devices at the affected area. The server computer 118 can identify the devices within, at, or near the affected area. In some embodiments, the server computer 118 can query a location system (e.g., a location server or the like) to request identities of devices within the affected area. The server computer 118 also can be configured to query various other systems, nodes, or devices such as, for example, a home location register ("HLR") or visitor location register ("VLR") associated with an cellular network to determine locations of devices and/or to identify one or more devices at or near the affected area. Because the server computer 118 can identify the devices in, at, or near the affected area in a variety of ways, it should be understood that these examples are illustrative and therefore should not be construed as being limiting in any way.

From operation 206, the method 200 proceeds to operation 208. At operation 208, the server computer 118 can obtain operational data 114 for the devices identified in operation 206. In the context of the embodiment shown in FIG. 1, the server computer 118 can obtain operational data 114 from the user device 102 and the devices 112. In some embodiments, the server computer 118 can query the devices identified in operation 206 for the operational data 114. In some other embodiments, the server computer 118 can obtain the operational data 114 from the devices identified in operation 206 without explicitly requesting the data from those devices.

For example, the devices identified in operation 206 can be configured to report the operational data 114 to the server computer 118 periodically, according to schedules, and/or upon various other triggering events such as, for example, arrival at or entry to the location 122, an indication that an emergency condition exists at or near the location 122, and/or based upon other triggering events. Because the server computer 118 can obtain the operational data 114 in additional and/or alternative ways, it should be understood that these examples are illustrative and therefore should not be construed as being limiting in any way.

From operation 208, the method 200 proceeds to operation 210. At operation 210, the server computer 118 can select a device to receive an alert trigger 120. In the context of the embodiment illustrated in FIG. 1, the server computer 118 may determine that the user device 102 is to receive the alert trigger 120. For purposes of illustrating and describing the concepts and technologies described herein, the method 200 will be described with reference to an embodiment in which the user device 102 is selected by the server computer 118 for receiving the alert trigger 120. Because the server computer 118 can identify and/or select various devices to receive the alert trigger 120, including but not limited to the user device 102 and/or any of the devices 112 shown in FIG. 1, it should be understood that this example is illustrative and therefore should not be construed as being limiting in any way.

According to various embodiments of the concepts and technologies described herein, the server computer 118 can select the device that is to receive the alert trigger 120 based upon the operational data 114, locations determined for one or more devices at an affected area, and/or other considerations. As explained above, the operational data 114 can include, but is not limited to, location data, battery status information, WiFi status information, and/or other information and/or data. As such, it can be appreciated that the server computer 118 can select the device to receive the alert trigger 120 based upon the location, battery status, WiFi status, and/or other status or information associated with the device selected. As explained above, various considerations may affect how these and/or other types of operational data 114 are used to select the device to receive the alert trigger 120. Because the device to receive the alert trigger 120 can be selected in additional and/or alternative ways, it should be understood that these examples are illustrative and therefore should not be construed as being limiting in any way.

From operation 210, the method 200 proceeds to operation 212. In operation 212, the server computer 118 can send the alert trigger 120 to the device selected in operation 210. Although not separately illustrated in FIG. 2, the server computer 118 can generate the alert trigger 120. The server computer 118 also can include, in the alert trigger 120, instructions for generating the alert 110, information relating to an emergency condition, boundaries and/or other identifying information for an area affected by the emergency condition, and/or instructions for recipients of the alert 110 and/or the device that is to send the alert 110. Because the alert trigger 120 can include additional and/or alternative information, it should be understood that these examples are illustrative and therefore should not be construed as being limiting in any way.

From operation 212, the method 200 proceeds to operation 214. The method 200 ends at operation 214.

Figure 3:
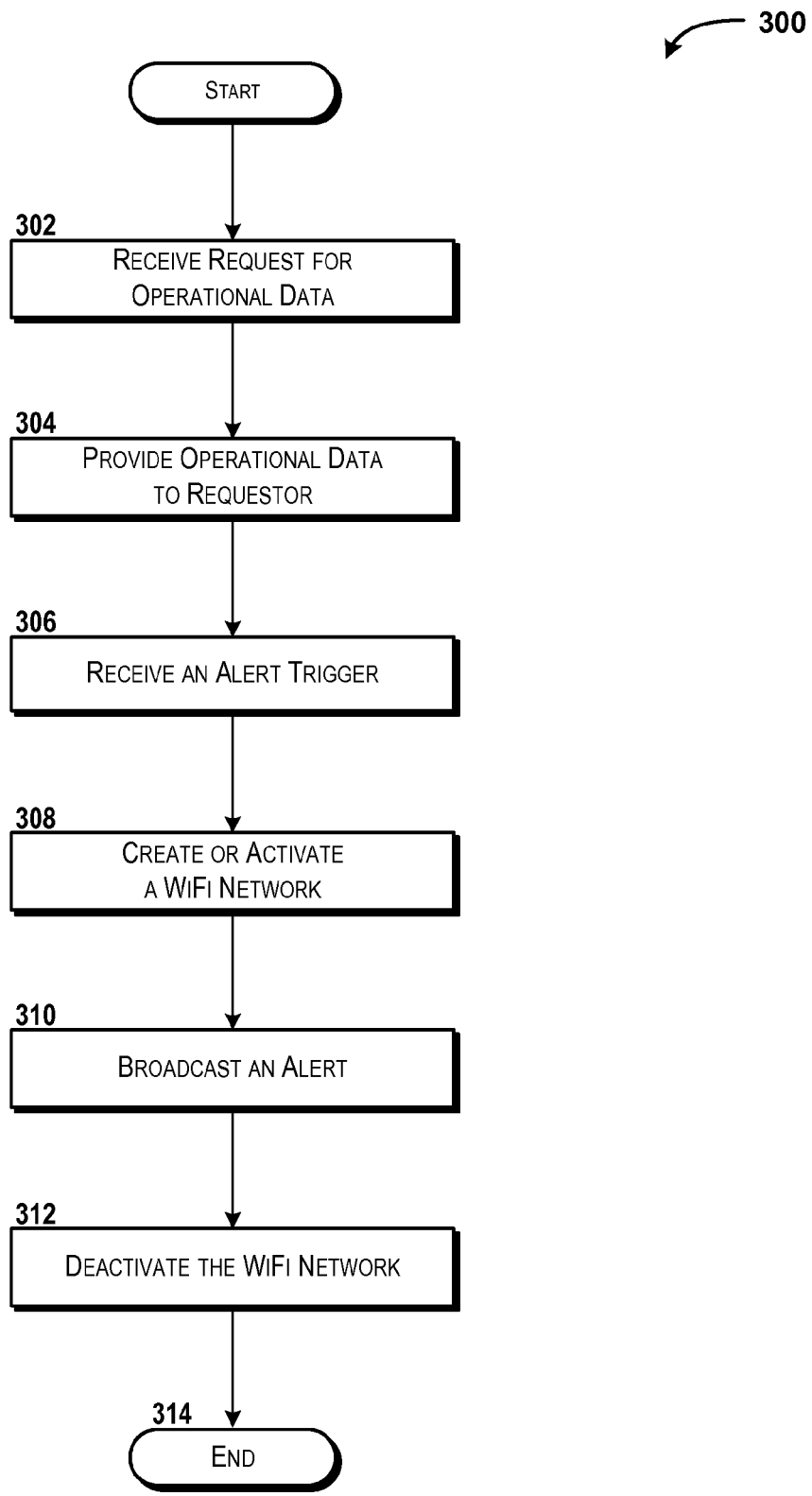
FIG. 3 is a flow diagram showing aspects of a method for broadcasting an alert from a device, according to another illustrative embodiment.

Turning now to FIG. 3, aspects of a method 300 for broadcasting an alert from a device will be described in detail, according to an illustrative embodiment. For purposes of illustrating and describing the concepts of the present disclosure, the method 300 will be described as being performed by the user device 102 via execution of one or more software modules such as, for example, the alert application 108. It should be understood that additional and/or alternative devices and/or network nodes can provide the functionality described herein via execution of one or more modules, applications, and/or other software including, but not limited to, the alert application 108. Thus, the illustrated embodiments are illustrative, and should not be viewed as being limiting in any way.

The method 300 begins at operation 302. At operation 302, the user device 102 receives a request for operational data 114. As explained above with reference to FIGS. 1-2, it can be appreciated that the user device 102 may receive the request for the operational data 114 from the server computer 118 and/or that the request may be generated by the server computer 118 in response to the server computer 118 identifying an emergency condition. In some embodiments of the concepts and technologies described herein, the user device 102 may not receive an explicit request for the operational data 114.

In some embodiments, the user device 102 may be configured, for example by executing the alert application 108 or other computer-executable instructions, to periodically generate the operational data 114 and/or to generate the operational data 114 upon occurrence of various triggering conditions such as entering the location 122, passage of certain time intervals or durations, and/or occurrence of other triggering events or the like. Thus, it can be appreciated that the request received in operation 302 may include an explicit request and/or may include an implicit request. Because the operational data 114 can be requested or obtained from the user device 102 in various ways, it should be understood that these examples are illustrative and therefore should not be construed as being limiting in any way.

From operation 302, the method 300 proceeds to operation 304. At operation 304, the user device 102 can provide the operational data 114 to the requestor. Although not explicitly shown in FIG. 3, it should be understood that the user device 102 can generate the operational data 114. In some embodiments, wherein the operational data 114 includes location data, the user device 102 can obtain its geographic location, e.g., by activating a global positioning system ("GPS") receiver at the user device 102, and formatting data that indicates the geographic location of the user device 102 for inclusion in the operational data 114.

Similarly, in some embodiments wherein the operational data 114 includes battery status information, the user device 102 can analyze its battery status and can format data that indicates the battery status of the user device 102 for inclusion in the operational data 114. Similarly, in some embodiments wherein the operational data 114 includes WiFi status information, the user device 102 can analyze its WiFi transceiver to determine an operating state of the WiFi transceiver, as well as current usage and/or availability for the WiFi transceiver. The user device 102 can format data that indicates the WiFi status of the user device 102 for inclusion in the operational data 114. Because the operational data 114 can include additional and/or alternative information, and because the user device 102 can generate the operational data 114 in additional and/or alternative ways, it should be understood that these examples are illustrative and therefore should not be construed as being limiting in any way.

From operation 304, the method 300 proceeds to operation 306. At operation 306, the user device 102 can receive an alert trigger such as the alert trigger 120. As explained herein, the alert trigger 120 can prompt the user device 102 to broadcast an alert 110 to devices at or near a proximity of the user device 102. As explained above, the alert trigger 120 can include, but is not limited to, instructions for generating an alert 110, information relating to an emergency condition at a particular location or other affected area, data for inclusion in the alert 110, combinations thereof, or the like. The alert trigger 120 can be configured to cause a device that receives the alert trigger 120 to generate an alert 110.

From operation 306, the method 300 proceeds to operation 308. At operation 308, the user device 102 can create or activate a WiFi network and/or other connection such as a hotspot, an access point, a peer-to-peer connection, or the like. For example, the user device 102 can create or activate a WiFi hotspot or a WiFi access point. According to various embodiments of the concepts and technologies described herein, the WiFi hotspot or access point created or activated by the user device 102 is created or activated with a dedicated service set identification ("SSID") or other unique identifier. As explained above, the dedicated SSID can correspond to an SSID that is used only with WiFi hardware that may be being used to communicate regarding emergency conditions. As such, data transmitted via any WiFi hardware using the dedicated SSID can be understood by devices configured to recognize the SSID as being emergency transmissions.

In some embodiments, devices at or near the user device 102 can be configured to execute an application program that is configured to recognize transmissions via WiFi hardware using the dedicated SSID. In some embodiments, for example, the device 112 and/or other devices can execute an application program similar or even identical to the alert application 108 executed by the user device 102. Via execution of the application program, the devices 112 and/or other devices can monitor radio signals at or near the devices 112 and/or other devices to identify transmissions occurring via WiFi hardware using the dedicated SSID. Thus, the devices 112 and/or other devices can be configured to recognize emergency transmissions based upon recognizing transmissions associated with the dedicated SSID. It should be understood that this example is illustrative and therefore should not be construed as being limiting in any way.

From operation 308, the method 300 proceeds to operation 310. At operation 310, the user device 102 can broadcast an alert such as the alert 110 shown in FIG. 1. Although not shown in FIG. 3, the user device 102 can be configured to generate the alert 110 based upon data from various sources such as, for example, the alert trigger 120. The alert 110 can include information describing an emergency condition, instructions for responding to the emergency, a location or locations associated with the emergency condition, and/or other information. In operation 310, the user device 102 can broadcast the alert 110 via the WiFi hotspot activated or created in operation 308.

From operation 310, the method 300 proceeds to operation 312. At operation 312, the user device 102 can deactivate the WiFi network activated or created in operation 308 and/or used in operation 310. By activating the WiFi hotspot or access point only upon receiving the alert trigger 120, and by deactivating the WiFi hotspot or access point after broadcasting the alert 110, the user device 102 can be configured to conserve resources such as battery power, or the like. Because the WiFi hotspot or access point can be deactivated for additional and/or alternative reasons, it should be understood that this example is illustrative and therefore should not be construed as being limiting in any way.

From operation 312, the method 300 proceeds to operation 314. The method 300 ends at operation 314.

Figure 4:
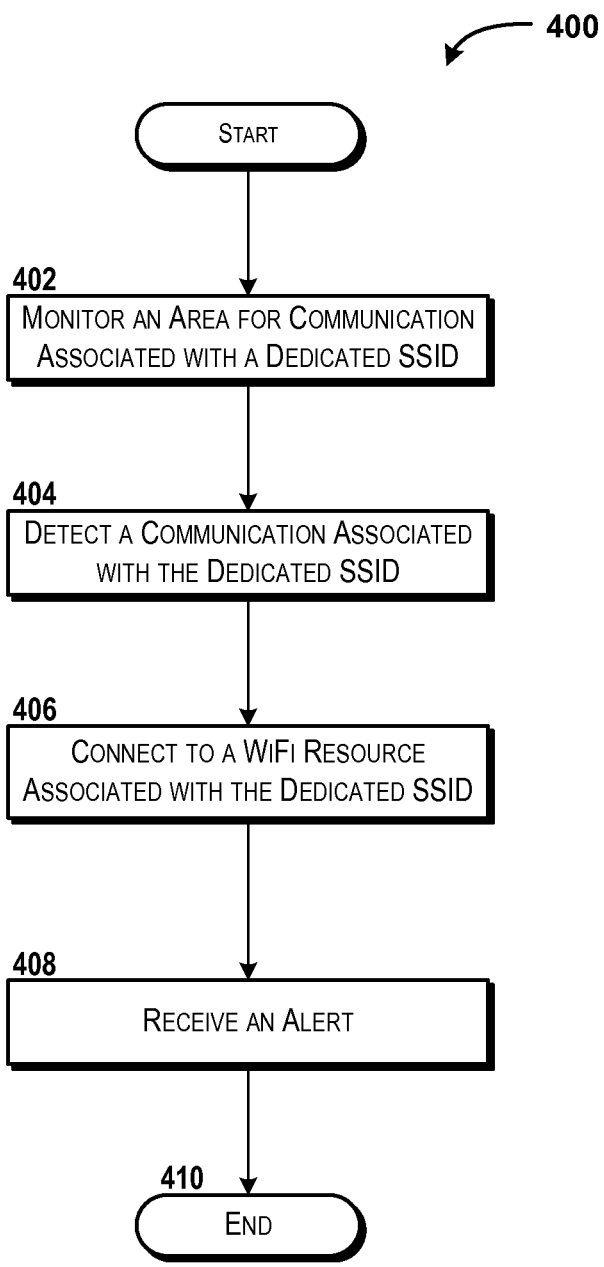
FIG. 4 is a flow diagram showing aspects of a method for receiving a broadcast alert from a device, according to another illustrative embodiment.

Turning now to FIG. 4, aspects of a method 400 for receiving a broadcast alert from a device will be described in detail, according to an illustrative embodiment. For purposes of illustrating and describing the concepts of the present disclosure, the method 400 will be described as being performed by the device 112 via execution of one or more software modules such as, for example, a software program that provides functionality similar or even identical to the alert application 108 described above with reference to the user device 102. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins at operation 402. At operation 402, the device 112 can monitor an area for a communication associated with a dedicated SSID. As explained above in detail, some embodiments of the concepts and technologies described herein can use WiFi transmissions over WiFi hotspots, access points, or the like using a dedicated SSID. As such, communications occurring via WiFi hotspots, access points, or the like using the dedicated SSID can be recognized by devices as corresponding to emergency communications or broadcasts. In the example embodiment illustrated and described in FIG. 4, the device 112 can be configured to recognize communications occurring via WiFi hotspots, access points, or the like using the dedicated SSID as emergency broadcast. As such, the device 112 can be configured to monitor wireless transmissions at or near the device 112 to detect communications occurring via WiFi hotspots, access points, or the like using the dedicated SSID. It should be understood that this example is illustrative and therefore should not be construed as being limiting in any way.

From operation 402, the method 400 proceeds to operation 404. At operation 404, the device 112 can detect a communication associated with the dedicated SSID. In particular, the device can detect a communication occurring via a WiFi hotspot, access point, or the like using the dedicated SSID. In some embodiments of the concepts and technologies described herein, the device 112 can monitor WiFi signals and determine, based upon the monitoring, that a WiFi hotspot, access point, or the like, exists with the dedicated SSID. Because various embodiments of the concepts and technologies described herein activate a WiFi hotspot or access point only to broadcast the alert 110, the presence or existence of the WiFi hotspot or access point associated with the dedicated SSID can be understood to indicate that an emergency condition exists. It should be understood that this example is illustrative and therefore should not be construed as being limiting in any way.

In some other embodiments, the device 112 can receive a communication from one or more entities such as a network element or other devices, nodes, systems, or the like. The communication can indicate that an alert is available and/or that a WiFi channel or network at or near the device 112 should be monitored or accessed to obtain an alert. Thus, some embodiments of the concepts and technologies described herein can support generating alerts to one or more devices 112 to monitor the WiFi channels or networks at or near the devices 112 instead of the devices 112 monitoring WiFi channels or the like to detect the presence of the dedicated SSID. It can be appreciated that a network or network device may broadcast a message to the devices 112 and/or other devices to monitor the WiFi channel without using excessive network resources since such a message may include a single bit message or a message having a size of only several bits. As such, some embodiments of the concepts and technologies described herein enable reduction of amounts of broadcast data by broadcasting only a small message to devices and then enabling local broadcast of more extensive data. It should be understood that this example is illustrative and therefore should not be construed as being limiting in any way.

From operation 404, the method 400 proceeds to operation 406. At operation 406, the device 112 can connect to a WiFi resource associated with the dedicated SSID. Thus, for example, the device 112 can connect to a WiFi hotspot associated with the dedicated SSID, an access point associated with the dedicated SSID, another device or network associated with the SSID, combinations thereof, or the like.

From operation 406, the method 400 proceeds to operation 408. At operation 408, the device 112 can receive an alert such as the alert 110 via the WiFi resource connected to in operation 406. As noted above, the alert 110 can indicate that an emergency condition exists and can define an area affected by the emergency condition. The alert 110 also can provide instructions for responding to the emergency, or the like. In some embodiments, the alert 110 can include computer-executable code for generating a graphical user interface element for informing a user or other entity that the emergency condition exists at or near the device 112.

One example of a graphical user interface that can be generated by the device 112 based upon the contents of the alert 110 received in operation 408, and/or by rendering a graphical user interface included in the alert 110 received in operation 408 is illustrated and described in more detail with reference to FIG. 5. Because the device 110 can inform a user or other entity about the emergency condition in additional and/or alternative ways, and because the alert 110 received in operation 408 may not include a graphic user interface or interface element, it should be understood that this example is illustrative and therefore should not be construed as being limiting in any way.

From operation 408, the method 400 proceeds to operation 410. The method 400 ends at operation 410.

Figure 5:
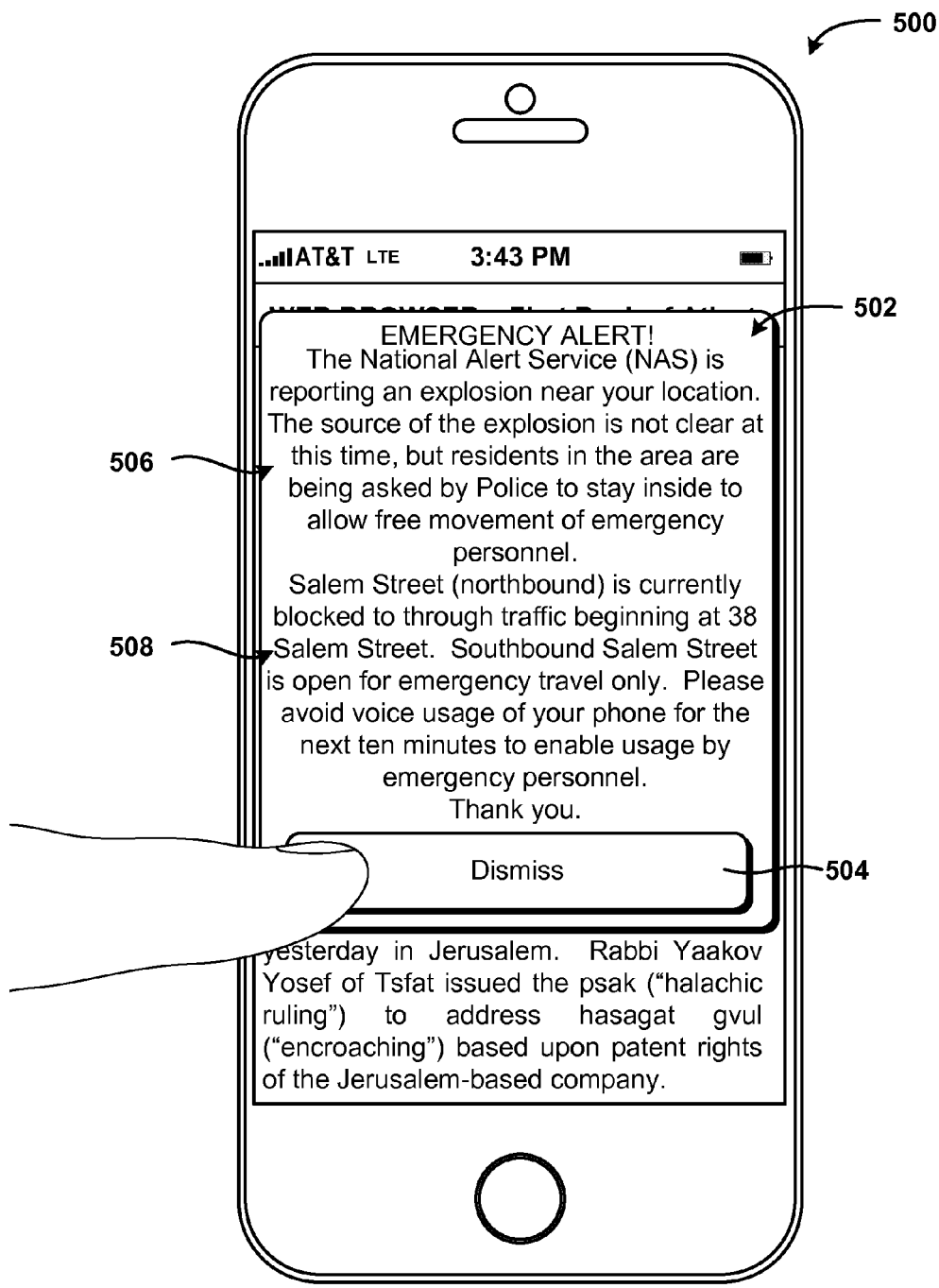
FIG. 5 is a user interface drawing showing aspects of the concepts and technologies described herein for providing effective broadcasting emergency messages, according to an illustrative embodiment.

FIG. 5 is a user interface ("UI") diagram showing aspects of a user interface ("UI") for interacting with, configuring, and/or providing functionality associated with an alert service, according to an illustrative embodiment of the concepts and technologies described herein. FIG. 5 shows an illustrative screen display 500 generated by a device such as the user device 102. According to various embodiments, the user device 102 can generate the screen display 500 and/or other screen displays in conjunction with execution of the alert application 108 and/or interactions with the alert service 110. It should be appreciated that the UI diagram illustrated in FIG. 5 is illustrative of one contemplated example of a UI and therefore should not be construed as being limited in any way.

The screen display 500 can include various menus and/or menu options (not shown in FIG. 5). The screen display 500 also can include an alert display window 502. The alert display window 502 can be presented as an overlay on top of any other user interface elements to present an alert such as the alert 110 shown in FIG. 1 to a user of the device. The alert display window 502 also can be interacted with by a user or other entity to dismiss the alert 100, for example, via selecting the UI control 504 to dismiss the alert 110.

In the embodiment shown in FIG. 5, the alert display window 502 includes an indication 506 of the emergency. The indication 506 can include data indicating a source of the emergency information being presented by way of the alert display window 502. In the illustrated embodiment, the source of the information is illustrated as being the National Alert Service (NAS). It should be understood that this example is illustrative and therefore should not be construed as being limiting in any way.

The indication 506 also can indicate a type of emergency condition being presented by way of the alert display window 502. In the illustrated embodiment, the type of emergency condition includes an explosion. It should be understood that this example is illustrative and therefore should not be construed as being limiting in any way.

The indication 506 also can indicate a location of the emergency that is associated with the emergency condition about which the user is being warned by way of presentation of the alert display window 502. In the illustrated embodiment, the location of the emergency condition is indicated as in an area of the user, but it should be understood that the indication 506 can include a street address, city block, neighborhood, county, state, or the like. Thus, it should be understood that the illustrated example is illustrative and therefore should not be construed as being limiting in any way.

As shown in the embodiment illustrated in FIG. 5, the alert display window 502 also can include instructions 508 relating to the emergency. The instructions 506 can instruct a recipient of the alert regarding the emergency and/or how to respond to the emergency. In some embodiments, the instructions 508 can include evacuation plans, instructions to remain in a current location, instructions for responding to weather conditions, instructions to activate applications or services via the telephone, combinations thereof, or the like. In the illustrated embodiment, the instructions 508 include travel instructions and device usage instructions. Because additional and/or alternative instructions can be included in the instructions 508, it should be understood that these examples are illustrative and therefore should not be construed as being limiting in any way.

Figure 6:
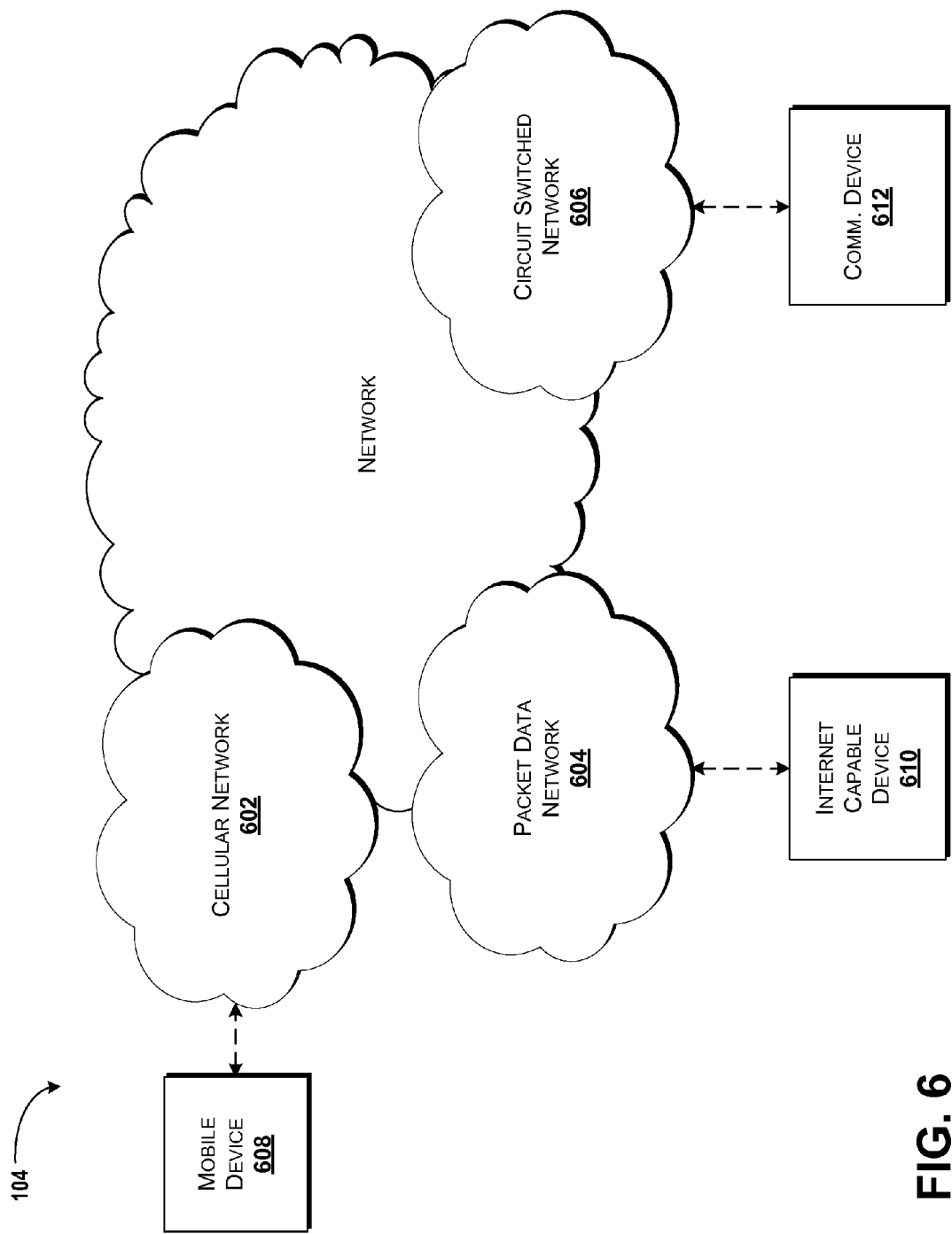
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
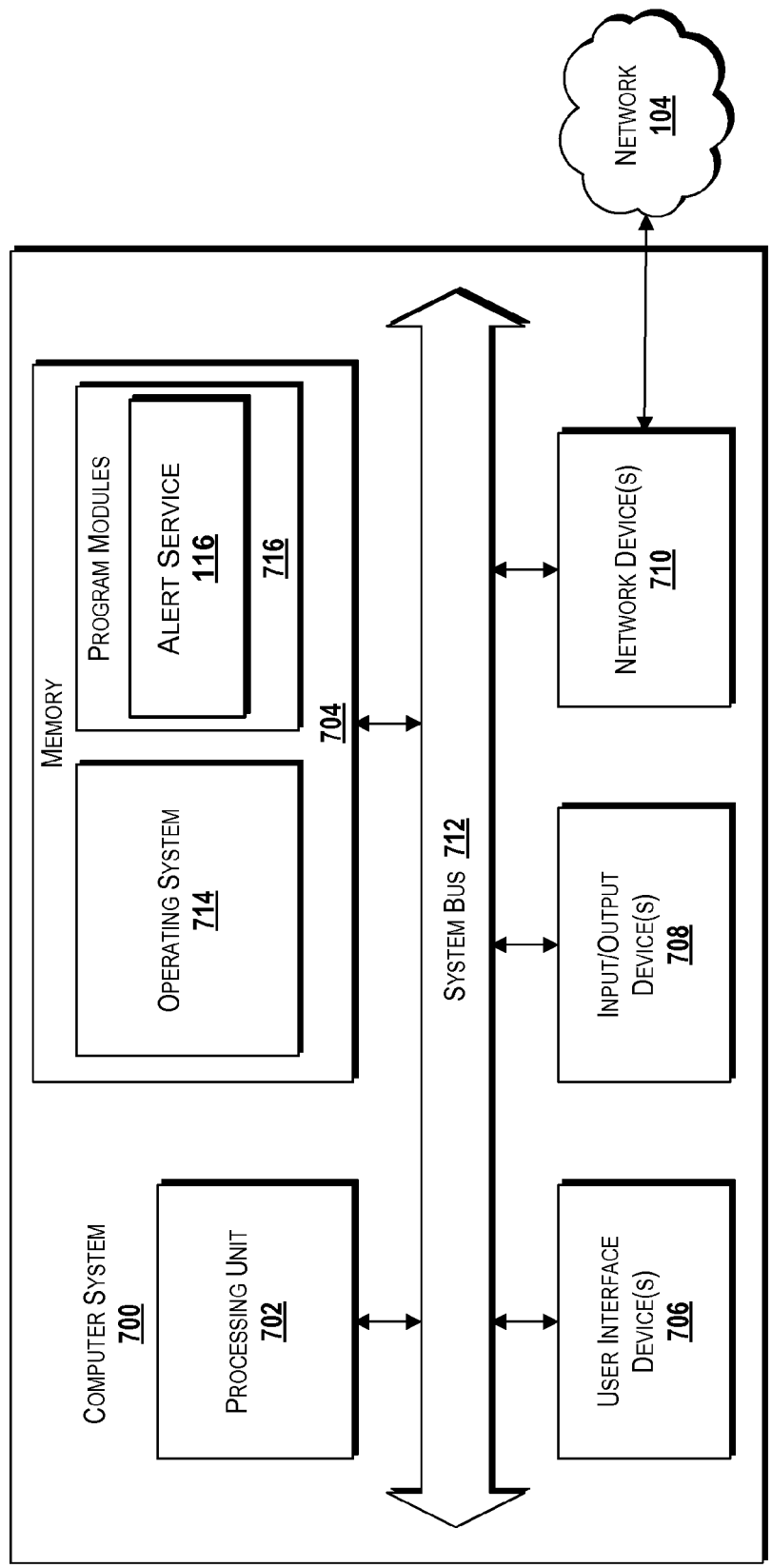
FIG. 7 is a block diagram illustrating an example computer system configured to provide effective broadcasting of emergency messages, according to some illustrative embodiments.

FIG. 7 is a block diagram illustrating a computer system 700 configured to provide the functionality described herein for effective broadcasting of emergency messages, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the alert service 116. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the operational data 114, the alert trigger 120, the emergency indicator 124, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
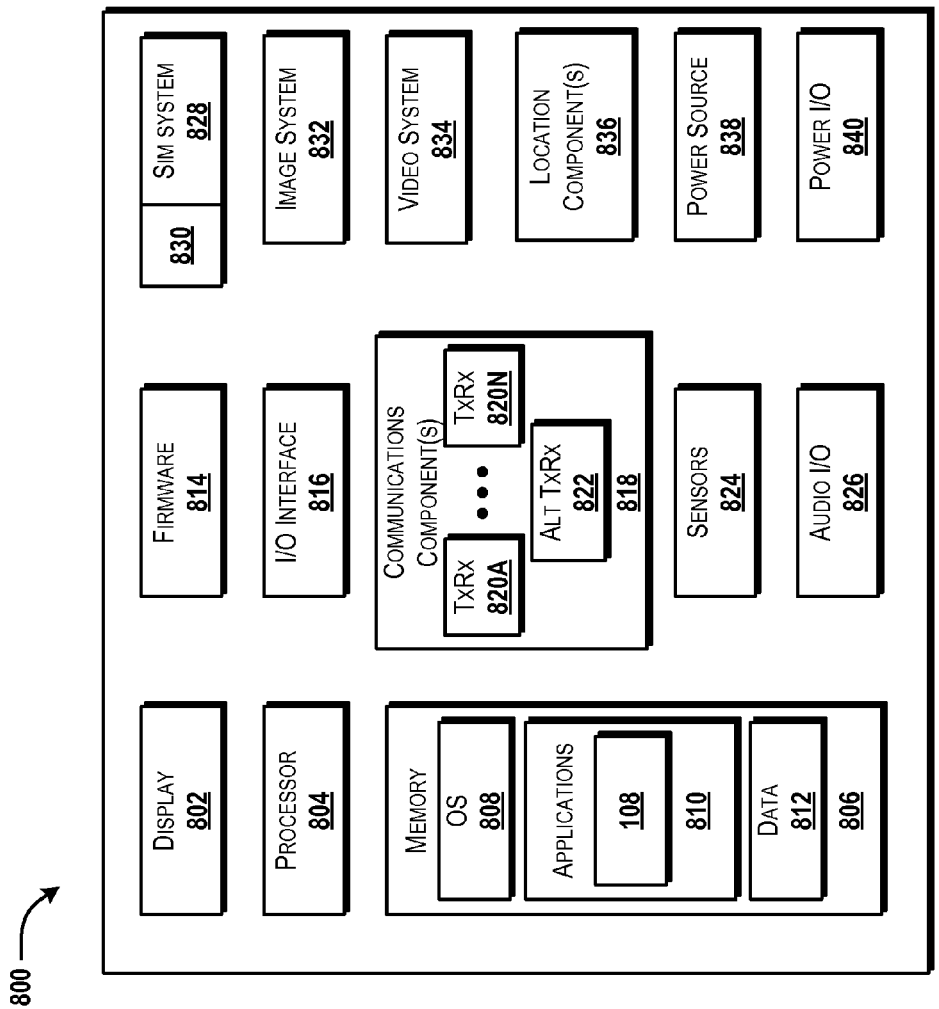
FIG. 8 is a block diagram illustrating an example mobile device configured to provide effective broadcasting of emergency messages, according to some illustrative embodiments.

Turning now to FIG. 8, an illustrative mobile device 800 and components thereof will be described. In some embodiments, the user device 102 and/or one or more of the devices 112 described above with reference to FIGS. 1-5 can be configured as and/or can have an architecture similar or identical to the mobile device 800 described herein in FIG. 8. It should be understood, however, that the user device 102 and/or the devices 112 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements for presenting alerts 110, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the alert application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, for viewing alerts and/or dismissing alerts, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the alert 110, the alert trigger 120, the operational data 114, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the operational data 114, the emergency indicator 124, the alert trigger 120, the alert 110, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for effective broadcasting of emergency messages have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, at a processor that executes an alert service, an emergency indicator that indicates that an emergency condition exists;
determining, by the processor, a geographic area affected by the emergency condition;
identifying, by the processor, a plurality of devices and a user device located at the geographic area;
obtaining, by the processor, operational data for each of the plurality of devices and the user device;
selecting, by the processor and based upon the operational data, the user device to broadcast, to the plurality of devices, an alert that indicates the emergency condition; and
sending, by the processor, an alert trigger to the user device, wherein the alert trigger causes the user device to
activate a wireless hotspot at the user device, the wireless hotspot being associated with a dedicated service set identifier, and
broadcast, via the wireless hotspot, the alert that indicates the emergency condition.

2. The method of claim 1, wherein selecting the user device comprises:
determining, for each of the plurality of devices and the user device, a battery level; and
selecting, based upon the battery level, the user device.

3. The method of claim 1, wherein the operational data comprises WiFi status information.

4. The method of claim 1, wherein the dedicated service set identifier comprises a service set identifier used for emergency communications, and wherein each of the plurality of devices monitors wireless signals to detect activation of the wireless hotspot with the dedicated service set identifier.

5. The method of claim 1, wherein the emergency indicator is received from a social networking service.

6. The method of claim 1, wherein the emergency indicator comprises an implicit indicator that the emergency condition exists, the implicit indicator being determined based upon analysis of a plurality of social networking posts.

7. The method of claim 1, wherein the emergency indicator comprises an explicit indicator that the emergency condition exists.

8. The method of claim 1, wherein the emergency indicator is received from an emergency dispatcher, and wherein the emergency indicator comprises an explicit indicator that the emergency condition exists.

9. The method of claim 1, wherein the alert that indicates the emergency condition comprises a description of the emergency condition, an indication of the geographic area, and instructions for responding to the emergency condition.

10. The method of claim 1, wherein the user device comprises a smart phone that executes an alert application, and wherein the user device generates the alert that indicates the emergency condition in response to the alert trigger and broadcasts the alert that indicates the emergency condition via the wireless hotspot.

11. A system comprising:
a processor; and
a memory that stores computer-executable instructions that, when executed by the processor, cause the processor to perform operations comprising
receiving an emergency indicator that indicates that an emergency condition exists,
determining a geographic area associated with the emergency condition,
identifying a plurality of devices and a user device located at the geographic area,
obtaining operational data for each of the plurality of devices and the user device,
selecting, based upon the operational data, the user device to broadcast, to the plurality of devices, an alert that indicates the emergency condition, and
sending an alert trigger to the user device, wherein the alert trigger causes the user device to
activate a wireless hotspot at the user device, the wireless hotspot being associated with a dedicated service set identifier, and
broadcast, via the wireless hotspot, the alert that indicates the emergency condition.

12. The system of claim 11, further comprising a server computer that hosts a social networking service, wherein the emergency indicator is received from the server computer.

13. The system of claim 11, further comprising a computer device that is associated with an emergency dispatcher, wherein the emergency indicator is received from the computer device.

14. The system of claim 11, wherein selecting the user device comprises:

determining, for each of the plurality of devices and the user device, a battery level; and selecting, based upon the battery level, the user device.

15. The system of claim 11, wherein the operational data comprises WiFi status information.

16. The system of claim 11, wherein the dedicated service set identifier comprises a service set identifier used for emergency communications, and wherein each of the plurality of devices monitors wireless signals to detect activation of the wireless hotspot with the dedicated service set identifier.

17. A computer storage medium having computer-executable instructions stored thereon that, when executed by a processor, cause the processor to perform operations comprising:

receiving an emergency indicator that indicates that an emergency condition exists;

determining a geographic area associated with the emergency condition;

identifying a plurality of devices and a user device located at the geographic area;

obtaining operational data for each of the plurality of devices and the user device;

selecting the user device to broadcast, to the plurality of devices, an alert that indicates the emergency condition; and sending an alert trigger to the user device, wherein the alert trigger causes the user device to activate a wireless hotspot at the user device, the wireless hotspot being associated with a dedicated service set identifier, and broadcast, via the wireless hotspot, the alert that indicates the emergency condition.

18. The computer storage medium of claim 17, wherein selecting the user device comprises:

determining, for each of the plurality of devices and the user device, a battery level; and selecting, based upon the battery level, the user device.

19. The computer storage medium of claim 17, wherein the operational data comprises WiFi status information.

20. The computer storage medium of claim 17, wherein the dedicated service set identifier comprises a service set identifier used for emergency communications, and wherein each of the plurality of devices monitors wireless signals to detect activation of the wireless hotspot with the dedicated service set identifier.

* * * * *